United States Patent [19]

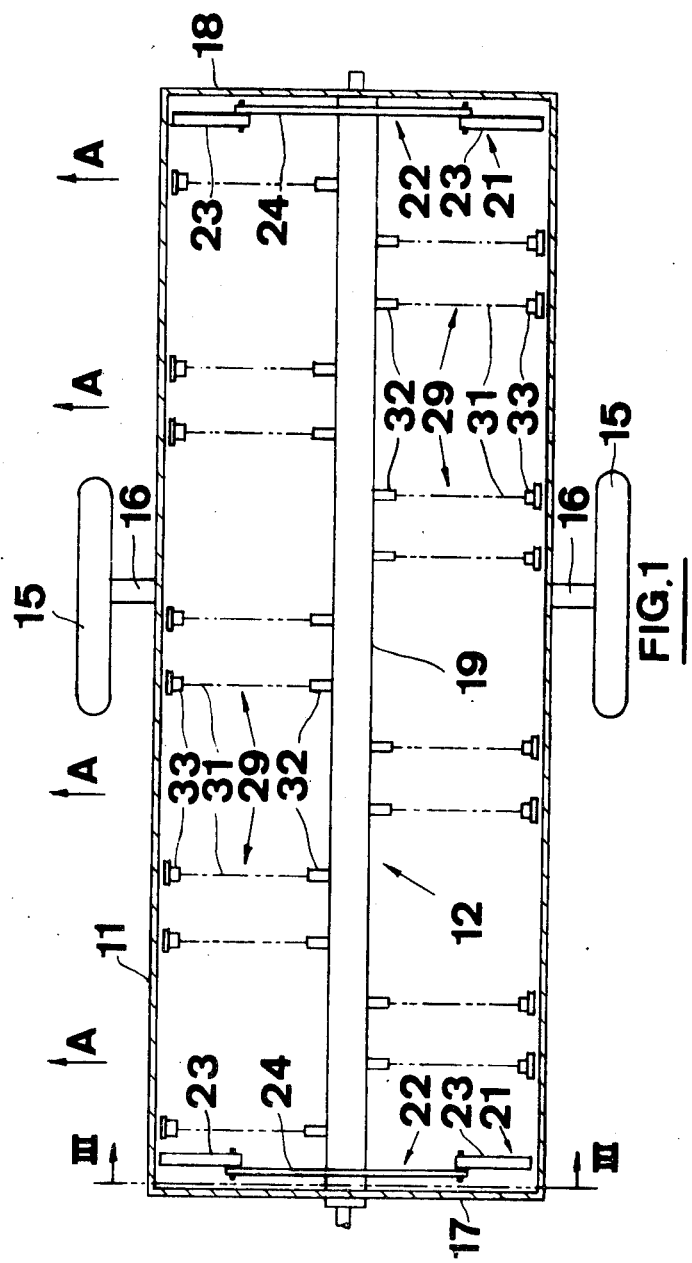

Haynes

[11] 4,155,510

[45] May 22, 1979

[54] MANURE SPREADER FLAIL

[75] Inventor: David J. Haynes, Leighton Buzzard, England

[73] Assignee: Sperry Rand Corporation, New Holland, Pa.

[21] Appl. No.: 886,196

[22] Filed: Mar. 13, 1978

[30] Foreign Application Priority Data

Mar. 11, 1977 [GB] United Kingdom ............... 10370/77

[51] Int. Cl.² .............................................. A01C 3/06
[52] U.S. Cl. .................................................. 239/658
[58] Field of Search ..................... 239/658, 662; 56/29; 172/45

[56] References Cited

U.S. PATENT DOCUMENTS

| | | | |
|---|---|---|---|
| 3,048,409 | 8/1962 | Elwick | 239/658 |
| 3,414,199 | 12/1968 | Ferris | 239/658 |
| 3,640,473 | 2/1972 | Webb et al. | 239/658 |
| 3,980,239 | 9/1976 | Lee | 239/658 |

*Primary Examiner*—Robert W. Saifer
*Attorney, Agent, or Firm*—Frank A. Seemar; John B. Mitchell; Ralph D'Alessandro

[57] ABSTRACT

A flail type material spreader has a tank for holding material, a rotor mounted within the tank and having flails provided thereon which, on rotation of the rotor, are operable to discharge material from the tank, the flails including at least one starter flail located at one end of the tank and comprising an elongate plate rigidly connected to the rotor and two flail heads connected to the plate on opposed sides of the rotor, opposed corners of the plate which lead the respective shorter sides of the plates on rotation of the rotor being smoothly curved.

8 Claims, 4 Drawing Figures

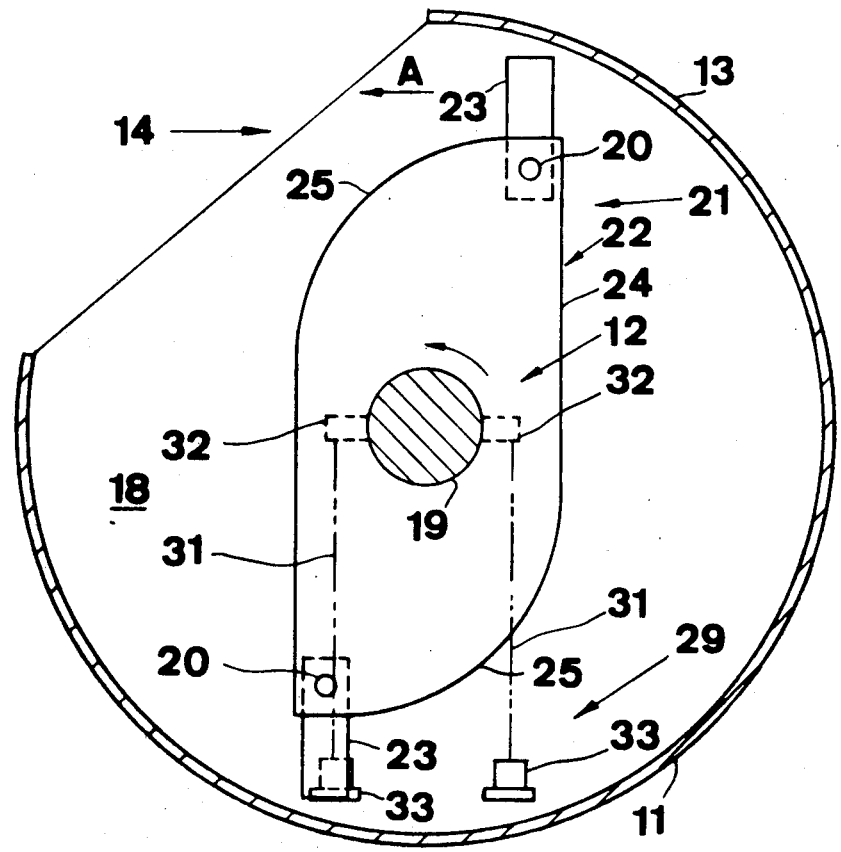

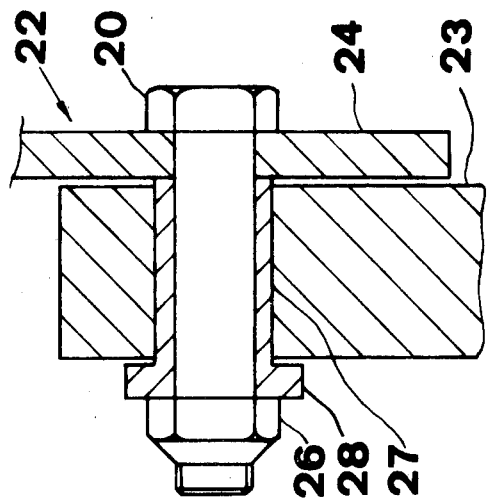
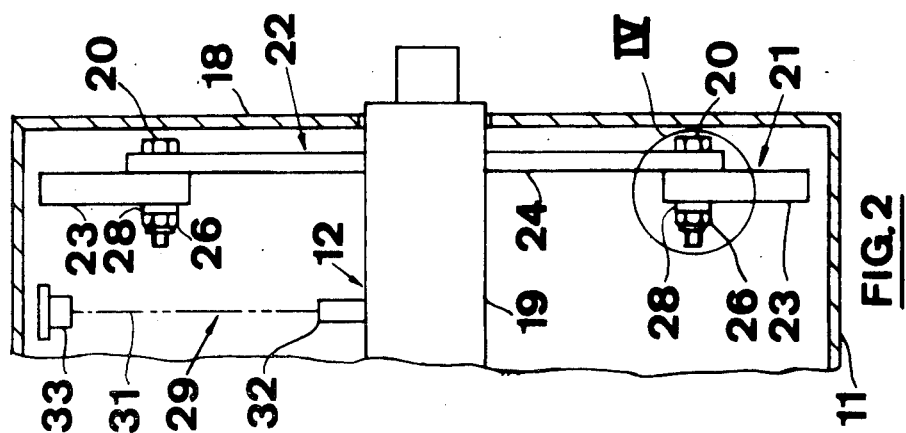

MANURE SPREADER FLAIL

BACKGROUND OF THE INVENTION

1. Field of the Invention

This invention relates to flail-type material spreaders and is directed particularly to improved flails for such material spreaders.

2. Description of the Prior Art

Flail-type material spreaders, such as disclosed in Pat. No. 3,980,239, for example, usually comprise a generally cylindrical tank with a longitudinally-extending shaft carrying flails comprising flexible members terminating in flail heads operable, on rotation of the shaft, to discharge material from the tank. A wide range of materials may be handled by such a spreader which is much in use on farms where it has to handle dry manure, sticky manure, sloppy manure, liquid manure, wet manure and frozen manure. Different types of animal bedding may be mixed with the manure which varies its consistency. The flail-type material spreader handles, to some degree of satisfaction, all of these various types of material and is, therefore, very versatile and adaptable to a wide range of conditions on farms.

The tank is mounted on a wheeled frame and usually extends in the direction of travel, the material being discharged by the flails throwing the material through an opening in the side of the tank. The rotor shaft is normally connected to the power-take-off of a tractor by which the spreader is towed across a field, in the case of farm use. The shaft is drivable over a range of speeds, the selected speed depending upon the required discharge action. The flails are usually of the chain type, as already mentioned, and different arrangements thereof may be employed. The simplest is a single row of flails connected along one side of the shaft. In another arrangement, two rows of diametrially opposed flails are provided on the shaft with the flails of the two rows either aligned or offset. Three rows of flails may be connected to the shaft at 120° intervals. In another arrangement, a single row of flails may be connected to the shaft along a spiral path or connected along the outer edge of an auger provided on the shaft. In some spreaders, four rows of flails are connected to the shaft at 90° intervals therearound.

Most flail-type spreaders have front and rear starter flails which act as impactors and are often pivotally mounted on the outer ends of rotor arms rigidly secured to the shaft.

The dry, wet or sticky manure is usually loaded into the spreader tank so that it is piled above the rotor shaft. Since the spreader is not operating during the loading, the flexible chains extend downwardly into the tank and the manure piles around the chains and holds them in this position. Or rotation of the shaft, the chains wrap around the rotor shaft and form an axial passage through the material without discharging the material from the spreader. The front and rear starter flails, due to their construction, start the discharge of the material. As the ends of the tank are cleared, the chain flails adjacent the starter flails start to unravel from the shaft and discharge the material from the tank. The material is thus progressively discharged from the end of the tank to the middle.

With a liquid or semi-liquid (slurry) material at a level about the shaft, the resistance of the liquid prevents the flails from throwing any significant amount of liquid out of the tank which greatly prolongs the unloading process. The majority of the liquid material is therefore discharged initially by the starter flails, as with solid materials. However, once the level of the liquid drops below the shaft, the flails become operative and assume an extended position to discharge the liquid or slurry along the entire length of the tank.

To the present time, although flail-type material spreaders have been used for a number of years, pivotable starter flails have not changed much and yet they are not entirely satisfactory. Known starter flails often comprise rotor arms of metal strip rigidly attached to the rotor shaft and having a flat member welded perpendicular thereto either along the longitudinal axis of the rotor arms or towards the leading edge thereof, and these flails operate to throw material out of the opening of the tank by brute force of impact of the flat member thereon.

Known flail heads, other than starter flails, comprise simple T-shaped metal members connected to the ends of the chains to assist in the breaking up of solid material and to impel manure out of the tank. In liquid or semi-liquid materials, however, these flails are not very efficient.

SUMMARY OF THE INVENTION

According to the present invention a flail-type material spreader comprises a tank for holding material, a rotor mounted within the tank and having flail means provided thereon which, on rotation of the rotor, are operable to discharge material from the tank, the flail means including at least one starter flail located at one end of the tank and comprising a generally elongate plate rigidly connected to the rotor and two flail heads connected to the plate on opposed sides of the rotor, opposed corners of the plate which lead the respective shorter sides of the plate on rotation of the rotor being smoothly curved.

Preferably, the flail heads are mounted at respective opposed corners of the starter flail plate which are not smoothly curved. The starter flail plate can be made relatively thin in relation to the flail head and this, in conjunction with the smoothly curved corners, enables the starter flail to cut through material loaded in the tank in a much more efficient manner than in known flail type material spreaders. With the present invention the torque required to rotate the rotor initially may be reduced by as much as 15%. Furthermore, the use of opposed pivotal flail heads on the starter flail gives rise to a symmetrical starter flail which thus reduces vibration, and hence wear and tear, on the spreader which can be a serious problem with known flail-type spreaders because considerable vibration and flexing of the tank and components takes place particularly as the tank empties.

Preferably, a starter flail is provided at each end of the tank.

IN THE DRAWINGS

A flail-type material spreader in accordance with the present invention will now be described in greater detail, by way of example, with reference to the accompanying drawings, in which:

FIG. 1 is a plan view of the spreader tank and rotor shaft with the tank shown in section, FIG. 2 is a view, to a larger scale, of the right-hand end of FIG. 1, FIG. 3 is a section on the line III—III of the FIG. 1 with a starter flail shown in different operating position, and FIG. 4 is a sectional view, to a larger scale, of part of the starter flail indicated at IV in FIG. 2.

DESCRIPTION OF THE PREFERRED EMBODIMENT

Figure 3:
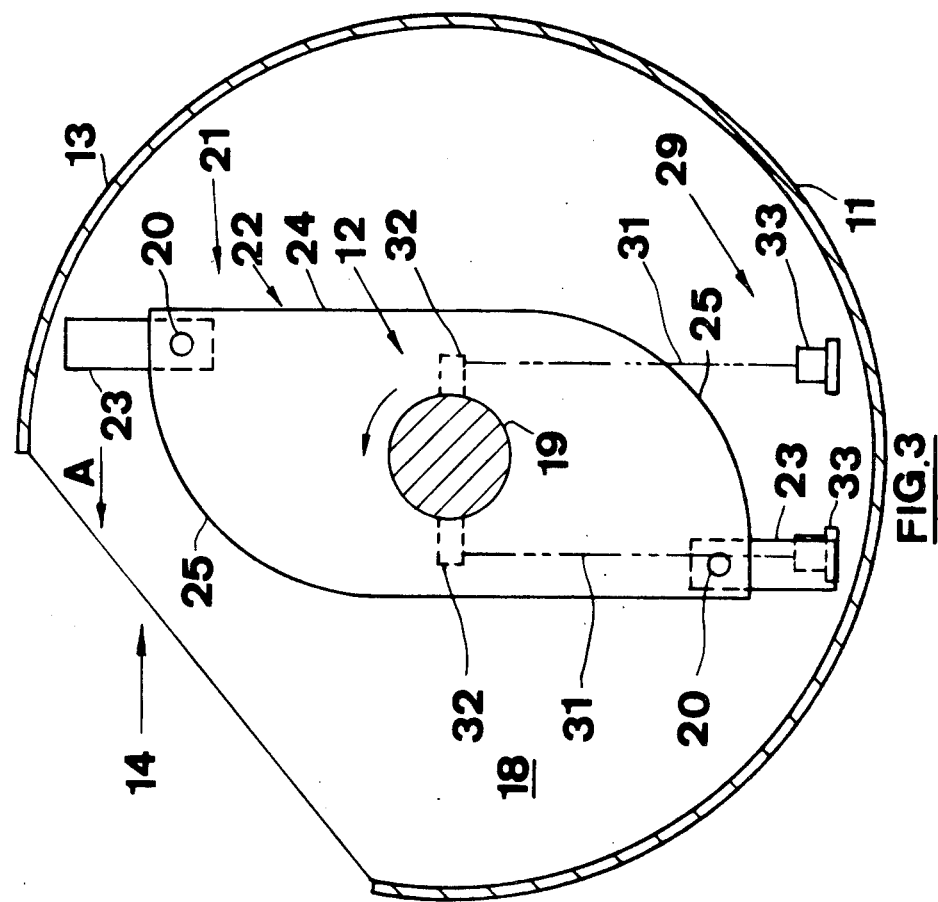

The material spreader comprises a generally cylindrical tank with a semi-cylindrical bottom 11 for holding material and in which is mounted a rotor 12. The tank also comprises a top 13 which defines, with the bottom 11, a side-opening 14 through which material is discharged frm the tank in the direction indicated by the arrows A. The tank is supported by a frame (not shown) and wheels 15 rotatably mounted on axle 16 on opposite sides of the tank. The shaft 12 is driven by the power-take-off of a tractor (not shown) through drive means (also not shown) at the front of the tank.

The semi-cylindrical bottom 11 of the tank is formed from sheet metal integrally with the top 13 and the tank is sealed at the ends by a front end wall 17 and a rear end wall 18.

The rotor 12 comprises a cylindrical shaft 19 rotatably mounted in bearings (not shown) attached to the front end wall 17 and the rear end wall 18, respectively. The rotor shaft 19 may be of the order of 7 to 12 feet in length, depending upon the length of the material spreader. At the ends of the rotor 12, adjacent the end walls of the tank, are front and rear starter flails 21 each comprising a rigid rotor arm 22 to opposed ends of which are pivotally connected flail heads 23.

Each rotor arm 22 is in the form of a metal plate 24, as seen in FIG. 3, which is generally elongate and has the metallic flail heads 23 pivotally attached to opposed corners. The other opposed corners of the plate 24 are radiused or smoothly curved at 25 in accordance with the present invention, the radius being struck from the opposite longer edge of the plate and being on the corners which lead, on rotation of the shaft, the respective shorter sides of the plate. The plate 24 is relatively thin compared with the thickness of the flail heads 23 and whilst the relative thicknesses and other dimensions are not critical, a satisfactory starter flail has been achieved by having the thickness of the plate 24 two and a half times less than the thickness of the flail heads 23, and having the length of the plate three times the width. More specifically, in one flail-type spreader constructed in accordance with the present invention, the tank has a diameter of 1320 mm, the plate 24 is 8 mm thick, 285 mm wide and 855 mm long, and the flail heads 23 are 20 mm thick, 50 mm wide and 250 mm long. The overall dimension of each starter flail, with each flail head 23 fully extended, is 1250 mm, and the radius of the corners 25 is 300 mm. (Being made as long as possible).

Each flail head 23 is attached to the plate 24 by a bolt 20 (FIG. 4) provided with a nut 26 and passing through a hardened bush 27 having a flange 28 and acting also as a spacer between the flail head and plate.

The shaft 19 is provided with two diametriacally-opposed rows of other flails 29, each comprising a chain 31 attached at one end to a lug 32 on the shaft and at the other end to a flail head 33 which may be of any known design such as disclosed, for example, in U.S. Pat. No. 3.980.239.

OPERATION

In operation, the tank is filled with material up to the level of the lower edge of the discharge opening 14, the precise level depending on the nature of the material being handled. If liquid or semi-liquid manure, for example, is behing handled, the loading level is kept below the discharge opening to prevent undesired discharge due to slopping during transit. When discharge and spreading of the material is required, the shaft 19 is rotated whereupon the chains 31 wrap around the shaft and initially do little to assist in the discharge of material. However, the rigid starter flails 21 rotate and act as impactors on the material to discharge the same from respective ends of the tank through the opening 14, the flail heads 23 initially being pivoted back from the position shown in FIG. 3 to lie along the respective shorter edges of the plate 24. As the speed of rotation of the shaft 19 increases to the full operational speed and as the material begins to be discharged, the flail heads 23 gradually move to the extended position of FIG. 3 in which they are most effective. As material is discharged, the flails 29 become progressively more effective as they unwrap from the shaft 19, the flail heads 32 flinging material from the tank through the discharge opening 14. As discussed above, the tank is unloaded from either end towards the centre when material other than liquid or semi-liquid is being handled.

If comparatively solid material is being handled, such as dry manure, the plates 24 of the starter flails 21 serve to slice or cut through the material with relative ease due to their thinness and the radiused corners 25, thereby reducing the start-up torque on the shaft 19 by as much as 15%. Furthermore, this design of starter flail reduces vibration to a minimum which is an important factor. As the plates 24 cut through the material and help to break it up, the flail heads 23 discharge material from the tank.

The design of starter flail 21 shown in the drawing has proved very satisfactory for the reduced torque and anti-vibration reasons discussed and has been found more efficient in these respects than a flail in which the plate has all four corners radiused and the flail heads 23 mounted at the centre of the shorter sides, for example. Also, the non-radiused corners allow the flail heads 23 to be mounted at the largest radial distance from the axis of rotation of the shaft 19 and in a position in which they trail to a maximum the respective leading edges of the plate 24 with respect to the direction of rotation thereof. In this way, the leading or curved edges 25 of plate 24 cut through the material being handled and the flail heads 23 then immediately act thereon to effect discharge.

I claim
1. A flail-type material spreader comprising:
- a chassis,
- a tank mounted on the chassis for holding material,
- a rotor rotatably mounted within the tank,
- a plurality of flail means provided on the rotor and operable on rotation of the rotor to discharge material from the tank,
- at least one generally elongate plate means rigidly connected to the rotor, the elongate plate means having shorter sides at opposite ends and spaced apart from the rotor, and edge portions leading the respective shorter sides on rotation of the rotor; said leading edge portions being smoothly curved for cutting through the material on rotation of the rotor,
- and flail heads connected to the plate means on opposed sides of the rotor, the plate means and the flail heads thereon forming a starter flail means for starting discharging material from the tank on rotation of the rotor.

2. A spreader according to claim 1, wherein the starter flail means are provided on the rotor at one end of the tank to start discharging material from said end of the tank.

3. A spreader according to claim 1, wherein a starter flail means is provided at each end of the rotor and adjacent opposite ends of the tank.

4. A spreader according to claim 1, wherein the flail heads are mounted at respective opposed corners of the elongate plate means trailing said smoothly curved edges on rotation of the rotor.

5. The spreader according to claim 1, wherein the starter flail means are symmetrical about the rotor axis.

6. A spreader according to claim 1 wherein the thickness of the plate means is two and a half times less than the thickness of the flail heads.

7. A spreader according to claim 1 wherein the length of the plate means is three times the width.

8. A spreader according to claim 1, further comprising:
- a bolt extending through an aperture at each of the opposed sides in the plate means;
- a hardened bush provided on each bolt and having a flange at one side and abutting the plate means at the other side, and
- said flail heads pivotally mounted on each bush inbetween the flange and the plate means.

* * * * *